United States Patent
Yang et al.

(10) Patent No.: US 6,797,754 B2
(45) Date of Patent: Sep. 28, 2004

(54) FLAME RETARDANT STYRENIC COMPOSITIONS CONTAINING OXAPHOSPHOLANE COMPOUND AS FLAME RETARDANT

(75) Inventors: Jae-Ho Yang, Gyeonggi-do (KR); Galina Levchik, Gangwon-do (KR); Alexander Balabanovich, Chungchungbuk-do (KR); Sang-Hyun Hong, Gyeonggi-do (JP)

(73) Assignee: Cheil Industries Inc., Kyungbuk (KR)

( * ) Notice: Subject to any disclaimer, the term of this patent is extended or adjusted under 35 U.S.C. 154(b) by 115 days.

(21) Appl. No.: 10/231,448

(22) Filed: Aug. 29, 2002

(65) Prior Publication Data
US 2003/0207968 A1 Nov. 6, 2003

Related U.S. Application Data
(60) Provisional application No. 60/378,527, filed on May 6, 2002.

(51) Int. Cl.$^7$ ............................................. C08K 5/5373
(52) U.S. Cl. ...................................................... 524/117
(58) Field of Search ......................................... 524/117

(56) References Cited

U.S. PATENT DOCUMENTS

| | | | |
|---|---|---|---|
| 3,639,506 A | 2/1972 | Haaf | 524/140 |
| 4,022,826 A | 5/1977 | Lohmar et al. | 562/817 |
| 4,113,669 A * | 9/1978 | Zondler et al. | 521/108 |
| 4,526,917 A | 7/1985 | Axelrod | 524/141 |
| 4,769,182 A | 9/1988 | Hazen | 562/24 |
| 5,334,760 A | 8/1994 | Wachi et al. | 562/817 |

FOREIGN PATENT DOCUMENTS

| | | |
|---|---|---|
| DE | 27 51 496 | 6/1978 |
| DE | 28 36 771 | 8/1978 |

* cited by examiner

*Primary Examiner*—Peter Szekely
(74) *Attorney, Agent, or Firm*—Maria Parrish Tungol

(57) ABSTRACT

The present invention relates to a flame retardant styrenic resin composition that comprises (A) about 5 to 95 parts by weight of a rubber modified styrene-containing resin; (B) about 95–5 parts by weight of polyphenylene ether; and (C) about 3–20 parts by weight of an oxaphospholane compound based on 100 parts by weight of the sum of (A) and (B). The resin composition of the present invention exhibits good flame resistance without the use of halogen flame retardant and does not emit harmful gases when burned.

16 Claims, No Drawings

FLAME RETARDANT STYRENIC COMPOSITIONS CONTAINING OXAPHOSPHOLANE COMPOUND AS FLAME RETARDANT

This application claims the benefit of Ser. No. 60/378,527 filed on May 6, 2002.

FIELD OF THE INVENTION

The present invention relates to flame retardant styrenic resin compositions which are environmentally friendly and have excellent flame retardancy without using a halogen-containing flame retardant. More particularly, the present invention relates to a flame retardant styrenic resin composition employing an oxaphospholane compound in the blend of a rubber-modified polystyrene resin and polyphenylene ether resin.

BACKGROUND OF THE INVENTION

Styrenic resin has excellent mold processability and mechanical properties so the resin has been widely used in electrical appliances. However the styrenic resin is extremely flammable. Therefore, the resin is subjected to various mandatory controls on their flammability in United States, Japan and Europe and is required to have high flame retardancy to meet the Underwriter's Laboratories Standard for the use of the housing of electrical appliances.

A widely known method for flame retardancy is the addition of a halogen-containing compound or an antimony-containing compound to a rubber modified styrene-containing resin to impart flame retardance. The examples of the halogen-containing compounds used in the method above are, for example, polybromodiphenyl ether, tetrabromobisphenol-A, epoxy compounds substituted by bromine, chlorinated polyethylene, etc. An antimony trioxide or an antimony pentaoxide is commonly used as an antimony-containing compound.

The methods for improving the flame-retardant property by applying a halogen- and antimony-containing compound have advantages such as easy acquisition of flame retardance and no degradation of the physical properties. However, it was observed that the halogen-containing compound resulted in the corrosion of the mold itself by the hydrogen halide gases released during the molding process. Also, these toxic gases are liberated in case of fire. Since a polybromodiphenyl ether, mainly used as a halogen-containing flame retardant, can produce toxic gases such as dioxin or furan during combustion, a major concern in this field is to develop a flame retardant which is prepared without a halogen-containing compound.

A method which employs a mono phosphoric acid ester compound such as triphenyl phosphate as a flame retardant without a halogen-containing compound, is known in the art. U.S. Pat. No. 3,639,506 and German Patent Laid-Open No. 27 51 496 disclose a resin composition wherein an aromatic phosphoric acid ester compound can be used as a flame retardant for a base resin comprised a styrenic resin and a polyphenylene ether resin.

U.S. Pat. No. 4,526,917 discloses that TPP and a mono phosphoric acid ester compound having a mesityl group are added to a base resin comprised a polyphenylene ether resin and a styrenic resin. However, the amount of polyphenylene ether is increased to improve a flame retardancy, so a flowability of the resin composition is decreased.

U.S. Pat. No. 4,503,178 disclosed cyclic phosphine oxides that are useful as flame retardants for styrene modified polyphenylene ether resins. Cyclic phosphinyl-carboxylic acid derivatives are not disclosed.

U.S. Pat. No. 4,081,463 relates to the production of 2-carboxyethyl(phenyl)phosphinic acid which is useful as a flame retardant with organic polymers such as polyester.

U.S. Pat. No. 5,334,760 discloses that a ring-opened oxaphospholane can be used as a flame retardant for polyester. A phosphinyl-carboxylic acid derivative in the form of a cyclic acid anhydride is also disclosed. The flame retardants are disclosed as being useful for polyester.

German Patent Laid-Open No. 28 36 771 discloses that a cyclic phosphate can be used as a flame retardant. The cyclic phosphate does not contain any carboxylic acid portion.

The present invention provides flame retardant styrenic resin composition which have good flame retardancy by using a non-halogen flame retardants and are suitable for the housing of electrical appliances. The resin composition of the present invention can be prepared by employing an oxaphospholane compound as a non-halogen flame retardant to a base resin comprised of rubber modified polystyrene resin and polyphenylene ether. The resin compositions according to the present invention are environmentally friendly and flame retardant with good mold processability and mechanical properties useful for the housing of electric appliances

SUMMARY OF THE INVENTION

A flame retardant thermoplastic resin composition according to the present invention comprises (A) about 5–95 parts by weight of a rubber-modified polystyrene resin, (B) about 95–5 parts by weight of polyphenylene ether, and (C) about 1–25 parts by weight of oxaphospholane compound based on 100 parts by weight of the sum of (A) and (B).

DETAILED DESCRIPTION OF THE INVENTION

A flame retardant thermoplastic resin composition according to the present invention comprises a rubber-modified styrene-containing resin (A), polyphenylene ether (B) and oxaphospholane compound (C). The rubber-modified styrene-containing resin (A) is used in an amount of about 5–95 parts by weight, preferably about 30–90 parts by weight. The polyphenylene ether (B) is used in an amount of about 95–5 parts by weight, preferably about 70–10 parts by weight. The oxaphospholane compound (C) is used in an amount of about 1–25 parts by weight based on 100 parts by weight of the sum of (A) and (B).

(A) Rubber-Modified Styrene-Containing Resin

A rubber-modified styrene-containing resin used in the present invention are known in the art and can be prepared by blending a rubber, a styrene-containing monomer, and polymerizing with heat or a polymerization initiator. Rubbers which can be used in this invention include polybutadiene, polyisoprenes, styrene-butadiene copolymers and alkylacrylic rubbers. The amount of the rubber is about 3 to 30 parts by weight, preferably about 5 to 15 parts by weight. Further, the styrene-containing monomer used to produce rubber-modified styrene-containing resin is comprised of styrene, α-methylstyrene, p-methylstyrene, and related styrenic monomers that are known in the art. Styrene is the preferred monomer. The monomer is used in an amount of about 70–97 parts by weight, preferably about 85–95 parts by weight.

The resin composition of the present invention can be polymerized with heat or a polymerization initiator. The polymerization initiator used in the present invention may be one or more selected from the group consisting of organic peroxides such as benzoyl peroxide, t-butyl hydroperoxide, acetyl peroxide and cumene hydroperoxide or azo compounds such as azobisisobutylonitrile (AIBN).

The rubber-modified styrene-containing resin of the present invention can be produced by a known polymerization method such as bulk polymerization, suspension polymerization, emulsion polymerization or combination thereof. In them, the bulk polymerization is preferred. To acquire optimum physical properties in consideration of the blend of rubber-modified polystyrene resin and polyphenylene ether, the average size of rubber particles is preferably in the range of from about 0.5 to 2.0 mm.

(B) Polyphenylene Ether (PPE)

Polyethylene ether is added to the rubber-modified styrenic resin to improve flame retardancy, rigidity and heat resistance. Polyethylene ethers suitable for use with rubber modified styrenic resins are known in the art. Examples of suitable polyphenylene ether resin include but are not limited to poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-pheylene) ether and poly(2,3,5-triethyl-1,4-phenylene) ether. Preferably, copolymer of poly(2,6-dimethyl-1,4-phenylene) ether and poly(2,3,6-trimethyl-1,4-phenylene) ether, and poly(2,6-dimethyl-1,4-phenylene) ether are preferably used, more preferably poly(2,6-dimethyl-1,4-phenylene) ether is preferably used.

The degree of polymerization of polyphenylene ether is not specifically limited, but considering heat-stability or processability of the resin composition, it is preferable that the viscosity of polypheylene ether is in the range of about 0.2 to 0.8 measured in chloroform solvent at 25° C.

(C) Oxaphospholane Compound

The oxaphospholane compound is represented by the following formula:

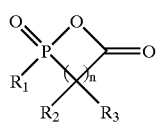
Formula (I)

wherein $R_1$ is hydrogen, alkyl of $C_{1-4}$, or aryl of $C_{6-10}$, $R_2$ and $R_3$ are hydrogen or alkyl of $C_{1-4}$, and n is in the range of 1 to 3.

The oxaphospholane compounds are known in the art and can be produced by known methods such as the method disclosed in U.S. Pat. No. 5,334,760, herein incorporated by reference. The preferable examples of the oxaphospholane compound are 2-methyl-2, 5-dioxo-1-oxa-2-phospholane and 2-phenyl-2,5-dioxo-1-oxa-2-phospholane. The amount of the oxaphospholane compound is about 1 to 25 parts by weight, preferably about 3 to 15 parts by weight on the basis of 100 parts by weight of the sum of (A) and (B).

The resin compositions according to the invention may contain customary additives such as additional phosphate flame retardants, anti-dripping agents, impact modifiers, plasticizers, inorganic filler, heat stabilizers, anti-oxidants, compatibilizers, light stabilizers, pigment and/or dye. The inorganic filler can be asbestos, glass fiber, talc, ceramic and sulfonate etc. The additives are employed in the amount of about 0 to 50 parts by weight on the basis of 100 parts by weight of the base resin, i.e., the sum of (A) and (B).

The following examples that are intended for the purpose of illustration and are not to be construed as limiting the scope of the present invention.

EXAMPLES

The components to prepare flame retardant thermoplastic resin compositions in Examples 1 to 4 and Comparative Examples 1 to 5 are as follows:

(A) Rubber Modified Polystyrene Resin

A rubber modified polystyrene resin by Cheil Industries Inc. of Korea (Product name: HI-1180) was used.

(B) Polyphenylene Ether Resin (PPE)

A poly(2,6-dimethyl-1,4-phenylene)ether by Asahi Co. of Japan (Product name: P-402) was used as PPE. The particles had the average size of several microns (mm) and were in the form of powder.

(C) Oxaphospholane Compound 2-methyl-2,5-dioxo-1-oxa-2-phospholane with a melting point of 242~245° C. was used.

(D) Trimethyl Phosphate (TPP)

TPP with a melting point of 48° C. was used.

Examples 1–4 and Comparative Examples 1–5

The components as shown in Table 1 were mixed and the mixture was extruded at 200~280° C. with a conventional twin-screw extruder in pellets. The resin pellets were dried at 80° C. for 3 hours, and molded into test specimens for measuring flame retardancy using a 6 oz injection molding machine at 180~280° C. and barrel temperature of 40~80° C. The flame retardancy was measured in accordance with UL94VB. The results are shown in Table 1.

TABLE 1

|  |  | Examples |  |  |  | Comparative Examples |  |  |  |  |
|---|---|---|---|---|---|---|---|---|---|---|
|  |  | 1 | 2 | 3 | 4 | 1 | 2 | 3 | 4 | 5 |
| Component | (A) | 80 | 80 | 60 | 40 | 80 | 100 | 80 | 80 | 60 |
|  | (B) | 20 | 20 | 40 | 60 | 20 | 0 | 20 | 20 | 40 |
|  | (C) | 5 | 20 | 5 | 5 | 0 | 5 | 0 | 0 | 0 |
|  | (D) | 0 | 0 | 0 | 0 | 0 | 0 | 5 | 20 | 20 |
| Flame Retardancy (2.0 mm) |  | V-0 | V-0 | V-0 | V-0 | Fail | Fail | Fail | V-2 | V-1 |

As shown in Table 1, when both an oxaphospholane compound and PPE are used (Examples 1–4), the resin composition shows good flame retardancy. On the other hand, when neither an oxaphospholane compound nor PPE is used (Comparative Examples 1–2), the resin composition shows poor flame retardancy. When a phosphoric acid ester compound is used instead of an oxaphospholane compound (Comparative Examples 3–5), flame retardancy is remarkably decreased.

What is claimed is:

1. A flame retardant styrenic resin composition comprising:
   (A) about 5–95 parts by weight of a rubber modified styrene-containing resin;
   (B) about 95–5 parts by weight of polyphenylene ether; and
   (C) about 1–25 parts by weight of an oxaphospholane compound based on 100 parts by weight of the sum of (A) and (B)

wherein the oxaphospholane compound (C) is represented by the following formula:

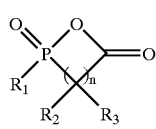

Formula (I)

wherein $R_1$ is hydrogen, alkyl of $C_{1-4}$, or aryl of $C_{6-10}$, $R_2$ and $R_3$ are hydrogen or alkyl of $C_{1-4}$, and n is in the range of 1 to 3.

2. The flame retardant styrenic resin composition according to claim 1, wherein the amount of the rubber modified styrene-containing resin (A) is about 30 to 90 parts by weight and the amount of the polyphenylene ether (B) is about 70–10 parts by weight.

3. The flame retardant styrenic resin composition according to claim 1, wherein (A) is a rubber-modified polystyrene resin.

4. The flame retardant styrenic resin composition according to claim 1, wherein the polyphenylene ether (B) is poly(2,6-dimethyl-1,4-phenylene)ether.

5. The flame retardant styrenic resin composition according to claim 1, wherein the oxaphospholane compound (C) is 2-methyl-2,5-dioxo-1-oxa-2-phospholane or 2-phenyl-2, 5-dioxo-1-oxa-2-phospholane.

6. The flame retardant styrenic resin composition according to claim 1, further comprising an additive selected from the group consisting of a flame retardant, an anti-dripping agent, an impact modifier, a plasticizer, an inorganic filler, a heat stabilizer, an anti-oxidant, a compatibilizer, a light stabilizer, a pigment and/or a dye.

7. A molded article prepared with the flame retardant styrenic resin composition of claim 1.

8. A molded article prepared with the flame retardant styrenic resin composition of claim 2.

9. A molded article prepared with the flame retardant styrenic resin composition of claim 3.

10. A flame retardant styrenic resin composition comprising:
    (A) about 30–90 parts by weight of a rubber modified polystyrene resin;
    (B) about 70–10 parts by weight of polyphenylene ether; and
    (C) about 3–15 parts by weight of an oxaphospholane compound based on 100 parts by weight of the sum of (A) and (B)

wherein the oxaphospholane compound (C) is represented by the following formula:

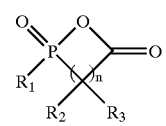

Formula (I)

wherein $R_1$ is hydrogen, alkyl of $C_{1-4}$, or aryl of $C_{6-10}$, $R_2$ and $R_3$ are hydrogen or alkyl of $C_{1-4}$, and n is in the range of 1 to 3.

11. The flame retardant styrenic resin composition according to claim 10, wherein the polyphenylene ether (B) is poly(2,6-dimethyl-1,4-phenylene)ether.

12. The flame retardant styrenic resin composition according to claim 10, wherein the oxaphospholane compound (C) is 2-methyl-2,5-dioxo-1-oxa-2-phospholane or 2-phenyl-2, 5-dioxo-1-oxa-2-phospholane.

13. A flame retardant styrenic resin composition comprising:
    (A) about 30–90 parts by weight of a rubber modified polystyrene resin;
    (B) about 70–10 parts by weight of polyphenylene ether; and
    (C) about 3–15 parts by weight of an oxaphospholane compound based on 100 parts by weight of the sum of (A) and (B)

wherein the oxaphospholane compound (C) is 2-methyl-2, 5-dioxo-1-oxa-2-phosphorane or 2-phenyl-2,5-dioxo-1-oxa-2-phosphorane.

14. A molded article prepared with the flame retardant styrenic resin composition of claim 10.

15. A molded article prepared with the flame retardant styrenic resin composition of claim 12.

16. A molded article prepared with the flame retardant styrenic resin composition of claim 13.

* * * * *